(12) United States Patent
Lev et al.

(10) Patent No.: US 11,170,208 B2
(45) Date of Patent: Nov. 9, 2021

(54) PHYSICAL ACTIVITY AUTHENTICATION SYSTEMS AND METHODS

(71) Applicant: NEC Corporation Of America, Herzlia (IL)

(72) Inventors: Tsvi Lev, Tel-Aviv (IL); Yaacov Hoch, Ramat-Gan (IL); Moshe Karako, Kiryat-Ono (IL)

(73) Assignee: NEC Corporation Of America, Herzlia (IL)

( * ) Notice: Subject to any disclaimer, the term of this patent is extended or adjusted under 35 U.S.C. 154(b) by 133 days.

(21) Appl. No.: 16/121,682

(22) Filed: Sep. 5, 2018

(65) Prior Publication Data

US 2019/0080157 A1    Mar. 14, 2019

Related U.S. Application Data

(60) Provisional application No. 62/558,408, filed on Sep. 14, 2017.

(51) Int. Cl.
| | |
|---|---|
| *G06K 9/00* | (2006.01) |
| *G06T 7/20* | (2017.01) |
| *G07C 9/28* | (2020.01) |
| *G07C 9/32* | (2020.01) |

(52) U.S. Cl.
CPC ....... *G06K 9/00342* (2013.01); *G06K 9/0055* (2013.01); *G06K 9/00362* (2013.01); *G06T 7/20* (2013.01); *G07C 9/28* (2020.01); *G06T 2207/30196* (2013.01); *G07C 9/32* (2020.01)

(58) Field of Classification Search
CPC ............. G06T 7/20; G06T 2207/30232; G06T 2207/30241; G06T 2207/30196; G07C 9/28; G07C 9/32; G06K 9/00342; G06K 9/00362; G06K 9/0055

See application file for complete search history.

(56) References Cited

U.S. PATENT DOCUMENTS

| | | | | |
|---|---|---|---|---|
| 7,683,929 | B2* | 3/2010 | Elazar | G01S 3/7864 |
| | | | | 348/169 |
| 9,292,936 | B2* | 3/2016 | Bronshtein | G06T 7/246 |
| 9,807,725 | B1* | 10/2017 | Vitus | G01S 1/00 |
| 9,911,290 | B1* | 3/2018 | Zalewski | G06Q 20/12 |
| 2004/0190718 | A1* | 9/2004 | Dacosta | H04L 63/0492 |
| | | | | 380/247 |

(Continued)

*Primary Examiner* — Katrina R Fujita

(57) ABSTRACT

A method of authenticating physical activity in a monitored space, comprising: obtaining monitored space activity data from at least one activity detector deployed in the monitored space to capture simultaneously physical activity of a plurality of moving objects in said monitored space; analyzing said monitored space activity data to identify a plurality of spatiotemporal movement patterns in said monitored space; obtaining a plurality of inertial data patterns from each one of a plurality of applications executed in a plurality of mobile devices, each one of said inertial data patterns is recorded using an inertial sensing device installed in one of said plurality of mobile devices, each one of said plurality of mobile devices is associated with one of a plurality of persons; identifying at least one correlation between at least one of said plurality of inertial data patterns and at least one of said plurality of spatiotemporal movement patterns; authenticating said physical activity according to said at least one correlation.

22 Claims, 6 Drawing Sheets

(56) References Cited

U.S. PATENT DOCUMENTS

| | | | |
|---|---|---|---|
| 2012/0046044 A1* | 2/2012 | Jamtgaard | H04N 7/181 |
| | | | 455/456.1 |
| 2015/0085111 A1* | 3/2015 | Lavery | H04N 7/183 |
| | | | 348/143 |
| 2016/0055651 A1* | 2/2016 | Oami | H04N 7/188 |
| | | | 348/143 |
| 2016/0300160 A1* | 10/2016 | Klein | H04W 8/005 |
| 2017/0308757 A1* | 10/2017 | Nguyen | H04L 12/4625 |
| 2018/0232563 A1* | 8/2018 | Albadawi | G06F 1/3206 |
| 2018/0232569 A1* | 8/2018 | Belkin | G06K 9/6292 |

* cited by examiner

PHYSICAL ACTIVITY AUTHENTICATION SYSTEMS AND METHODS

RELATED APPLICATION(S)

This application claims the benefit of priority under 35 USC § 119(e) of U.S. Provisional Patent Application No. 62/558,408 filed on Sep. 14, 2017. The contents of the above application are all incorporated by reference as if fully set forth herein in its entirety.

FIELD AND BACKGROUND OF THE INVENTION

Some embodiments of the present invention relate to authenticating systems and methods, and, more specifically, but not exclusively, to systems and methods of authenticating physical activity in a monitored space.

Monitoring a location, such as by utilizing global positioning systems (GPS), is of great commercial interest for various applications, in particular, for tracking applications.

Current mobile and wearable platforms provide sensors that enable a certain level of integrated location tracking using both absolute location sensors (GPS) and inertial sensors (accelerometers, gyroscopes, magnetometers). The precision of the inertial sensors may allow for distinguishing between a person sitting, walking, loitering and/or running.

Imaged based sensors may provide location tracking of objects, yet cannot identify them and/or assign them a unique ID.

SUMMARY OF THE INVENTION

According to an aspect of some embodiments of the present invention, there is provided a method of authenticating physical activity in a monitored space. According to some embodiments, the method comprising: obtaining monitored space activity data from at least one activity detector deployed in the monitored space to capture simultaneously physical activity of a plurality of moving objects in the monitored space; analyzing the monitored space activity data to identify a plurality of spatiotemporal movement patterns in the monitored space; obtaining a plurality of inertial data patterns from each one of a plurality of applications executed in a plurality of mobile devices, each one of the inertial data patterns is recorded using an inertial sensing device installed in one of the plurality of mobile devices, each one of the plurality of mobile devices is associated with one of a plurality of persons; identifying at least one correlation between at least one of the plurality of inertial data patterns and at least one of the plurality of spatiotemporal movement patterns; and authenticating the physical activity according to the at least one correlation.

According to an aspect of some embodiments of the present invention, there is provided a method of monitoring a consumer in a monitored space. According to some embodiments, the method comprising: obtaining monitored space activity data from at least one activity detector deployed in a monitored location to capture simultaneously physical activity of a plurality of moving objects in the monitored space; analyzing the monitored space activity data to identify a plurality of spatiotemporal movement patterns in the monitored space; obtaining a plurality of inertial data patterns from each one of a plurality of applications executed in a plurality of mobile devices, each one of the inertial data patterns is recorded using an inertial sensing device installed in one of the plurality of mobile devices, each one of the plurality of mobile devices is associated with one of a plurality of persons; identifying at least one correlation between at least one of the plurality of inertial data patterns and at least one of the plurality of spatiotemporal movement patterns; identifying a location of one of the plurality of persons according to the at least one correlation; and generating navigational information via the mobile device based on the identified location of the person in the monitored space.

According to some embodiments of the invention, the method wherein the identifying at least one correlation further comprising determining whether a person was exposed to a location or a location based content by comparing data of the identified location to a location data stored in a database.

According to some embodiments of the invention, the method wherein the identifying at least one correlation further comprising providing tags for each one of the plurality of mobile devices and storing the tags in a database for mapping each one of the plurality of mobile devices and comparing data of each of the mapped mobile devices to the identified location and/or location based content.

According to some embodiments of the invention, the method wherein the location based content is a product, a service or an advertisement.

According to some embodiments of the invention, the method wherein the correlating is carried out while recording the inertial data patterns.

According to some embodiments of the invention, the method wherein the monitored space comprising at least one access-restricted monitored region and the analyzing further comprising analyzing location data associated with each of the spatiotemporal movement patterns in the at least one access-restricted region, and correlating the location data with inertial data patterns of each of the plurality of persons in the region to authenticate access of the person to the region according to the correlation.

According to some embodiments of the invention, the method wherein the location data of each of the person is mapped to identify at least one irregularity in the monitored region.

According to some embodiments of the invention, the method wherein the mapping is correlated with structural information of the monitored region to calculate navigational instructions associated with each of the irregularities.

According to some embodiments of the invention, the method wherein the at least one activity detector is a motion sensor capturing motion of the at least one person in the monitored space, and correlating the captured motion to inertial data patterns recorded in each of the plurality of mobile devices associated with one of a plurality of persons.

According to some embodiments of the invention, the method wherein the at least one activity detector capturing new presence of at least one person in the monitored space and comprising at least one of: a Passive Infrared (PIR) motion sensor, a microwave sensor, a laser tripwire and a temperature gauge; and wherein the correlation is between inertial data measurements indicative of physical movement and the captured new presence.

According to some embodiments of the invention, the method wherein the at least one activity detector is a presence sensor capturing presence of the at least one person in the monitored space, the capturing presence estimated by analyzing entries and/or exits of at least one person in and/or out of at least one region in the monitored space.

According to some embodiments of the invention, the method wherein the at least one activity detector is an image sensor capturing an event and/or image generated by at least one of a motion, a presence and an activity of the at least one person in the monitored space.

According to some embodiments of the invention, the method wherein the correlating is carried out without identifying a person based on an image of the person captured by a camera installed in the mobile devices.

According to some embodiments of the invention, the method further comprising identifying a deviating person activity pattern by learning, over a time interval, inertial data and/or directional data associated with each person authorized to occupy the monitored space and correlating each of the inertial and/or directional data with the spatiotemporal movement patterns to authenticate each of the physical activities according to each of the correlations.

According to some embodiments of the invention, the method wherein the correlating between the plurality of inertial data patterns and the plurality of spatiotemporal movement patterns is carried out by at least one processor coupled to a server; and authenticating the physical activity according to the correlation.

According to some embodiments of the invention, the method wherein the obtaining monitored space activity data from at least one activity detector is initiated by detecting a signal indicating physical activity of at least one of the moving objects in the monitored space.

According to some embodiments of the invention, the method further comprising analyzing an operational status of each of the plurality of mobile devices monitored in the space in conjunction with obtaining monitored space activity data.

According to some embodiments of the invention, the method wherein the at least one activity detector generates an indication indicating of a physical activity in the monitored space, the indication is captured by at least one activity detector which forwards the indication to trigger collecting monitored space activity data in the monitored space.

According to some embodiments of the invention, the method further comprises communicating the physical activity and spatiotemporal movement pattern to a server via a wireless network.

According to some embodiments of the invention, the method further comprising analyzing at least one of a direction, an orientation and a posture of the plurality of persons.

According to some embodiments of the invention, the method wherein the monitored space is an indoor location.

According to some embodiments of the invention, the method wherein the physical activity comprises at least one member of a group consisting of: a presence, a duration of presence, a movement, a path of movement, a duration of movement, a presence of another person and a physical interaction with the plurality of mobile devices.

According to an aspect of some embodiments of the present invention, there is provided a system for authenticating physical activity in a monitored space. According to some embodiments of the invention, the system comprising: at least one activity detector deployed in the monitored space to capture simultaneously physical activity of a plurality of moving objects in the monitored space; a receiver for receiving at least one signal from the at least one activity detector indicating a physical activity in the monitored space; at least one inertial sensing device installed in a plurality of mobile devices to record inertial data patterns of each the persons in the monitored space, each the plurality of mobile devices is associated with one of a plurality of persons; at least one server coupled to the plurality of mobile devices and to the at least one activity detector via at least one network, and adapted to identify at least one correlation between at least one of the plurality of inertial data patterns and at least one of the plurality of spatiotemporal movement patterns, the correlating carried out while recording the inertial data patterns.

According to an aspect of some embodiments of the present invention, there is provided a system for monitoring a consumer in a monitored space. According to some embodiments of the invention, the system comprising: at least one activity detector deployed in the monitored space to capture simultaneously physical activity of a plurality of moving objects in the monitored space; a receiver receiving at least one signal from the at least one activity detector indicating a physical activity in the monitored space; at least one inertial sensing device installed in a plurality of mobile devices to record inertial data patterns of each the persons in the monitored space, each one of the plurality of mobile devices is associated with one of a plurality of persons; at least one server coupled to the plurality of mobile devices and to the at least one activity detector via at least one network, and adapted to identify: at least one correlation between at least one of the plurality of inertial data patterns and at least one of the plurality of spatiotemporal movement patterns; and a location of one of the plurality of persons according to the at least one correlation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of some embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL
VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

Figure 1:
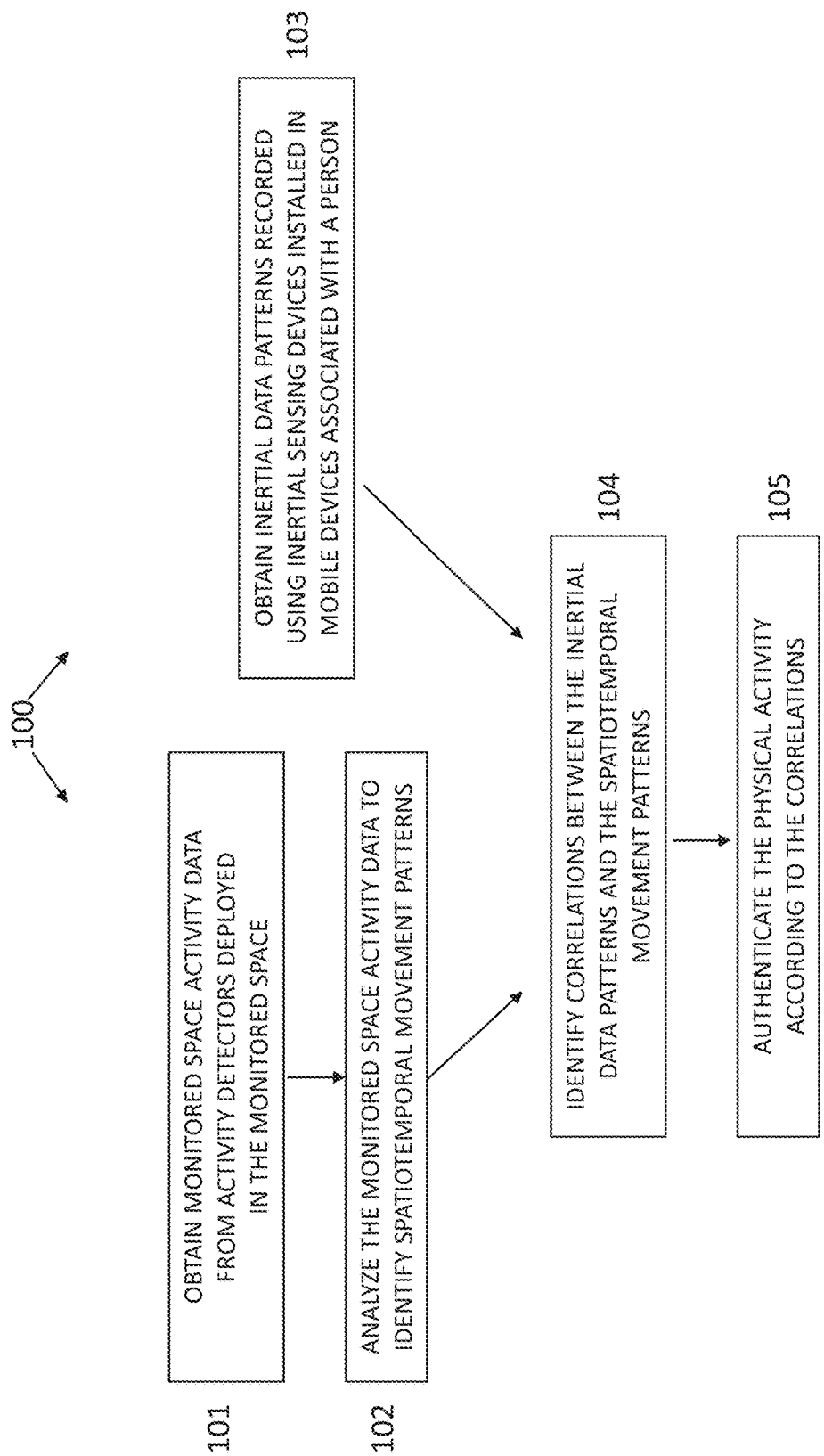
FIG. 1 is a flowchart of an exemplary method of authenticating physical activity in a monitored space, according to some embodiments of the present invention.

Some embodiments of the present invention, relate to authenticating systems and methods, and, more specifically, but not exclusively, to systems and methods of authenticating and/or monitoring physical activity in a monitored space.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments and/or of being practiced and/or carried out in various ways.

Some embodiments of an aspect of the present invention provide a system and method for accurately correlating between physical activities (e.g., presence) simultaneously detected in a monitored space (e.g., by stationary motion sensors distributed throughout a monitored space for sensing activity of a plurality of persons) and an authorized person in the monitored space, in order to evaluate validity of the physical activities. Some embodiments of the present invention utilize, on the one hand, activity detectors deployed in the space (e.g., physically fixed sensors within a space) to detect physical activity of a plurality of persons in the monitored space, and on the other hand, inertial sensing devices installed in mobile devices for obtaining inertial data of authorized persons in the monitored space. Each data associated with each of the activities is analyzed to provide spatiotemporal movement patterns and inertial data patterns, respectively. The patterns are then correlated to track and yet even identify each of the persons detected in the monitored space, and as such, the detected physical activity of each of the plurality of persons may be authenticated according to the correlation, e.g., by determining a positive correlation of a detected physical activity in the monitored space with one of the persons (a mobile device) in a certain location in the monitored space is indicative of an authorized physical activity. Inertial and/or directional information of a mobile device at a defined time (a distinct location and/or direction in the space at a defined time) may be paired to readings from activity sensor(s) at same time in the space, to correlate between the information from the mobile device and readings from activity sensor(s). As such, various mobile devices and detected persons may be correlated by simultaneously pairing mobile device location and/or directional readings and activity sensor readings (e.g., fixed sensors in the space). Each pair of mobile device readings and physical fixed sensor readings may be correlated according to a best match (and/or above a defined threshold), to provide accurate identification of each mobile device in a defined space.

Some embodiments of the present invention further provide accurate authentication of a physical activity of a person detected in the monitored space (e.g., presence and/or movement of the detected person) when the person is carrying an authorized mobile device in the monitored space (e.g., authenticating whether an authorized mobile device in a monitored space is verified to be carried by a detected person carrying and/or holding the mobile device), without need for the person to perform an action and/or expose the mobile devices, by correlating between motion patterns of people authorized to be associated with each of the mobile devices and detected spatiotemporal movement patterns of a plurality of moving objects from at least one activity detector deployed in the monitored space.

In addition, authentication of the physical activities through correlation with inertial data patterns may require a small investment as the activity detectors used herein are typically already deployed in facilities, for example, organizations, institutions and/or the like, and inertial sensing devices may be utilized from typical mobile devices, which may comprise inertial sensing devices already installed in the mobile devices.

Some embodiments of the present invention enable efficient and accurate monitoring of physical activities in a space, in particular, without need to modify mobile device components and/or without requiring additional expensive hardware within the space. Some embodiments of the present invention provide high accuracy real-time authentication of physical activities captured simultaneously in a monitored space. For example, when a device, such as a camera is used according to some embodiments, for locating a person's torso and/or head, accuracy of between about 1 and about 6 inches may be reached. Alternatively and/or additionally, when an RF based sensor is used according to some embodiments, (e.g., detected motion in a space from WiFi router(s)) accuracy may be about a few meters (e.g., about 1-2 m), for example, by carrying out the correlation while recording the inertial data patterns (e.g., simultaneously performing calculations in order to identify the correlation(s) while continuously and/or periodically gathering inertial data patterns and/or spatiotemporal movement patterns obtained in the monitored space).

Some embodiments of an aspect of the present invention yet further provide a system and method of monitoring consumers in a monitored space by correlating between physical activity of the consumer and identified location pattern(s) from a consumer's mobile device, to generate thereto a signal based on the identified location, for example, providing the consumer with navigational information and/or advertisement data via the mobile device.

In an optional implementation of the first aspect according to the present invention, the correlation may be carried out by comparing spatiotemporal data relating to the mobile devices with the spatiotemporal data movement patterns (e.g., relating to physical activity of a plurality of moving persons within the monitored space). The correlation may be carried out by comparing physical activity that may be required to deviate from typical physical activities of each of the authorized persons in the monitored space and comparing it to actual physical activity of persons detected in the monitored space.

In a further optional implementation of the first aspect, physical location and/or activity information of the plurality of activity detectors and/or the plurality of persons associated with the mobile devices (e.g., inertial data patterns of each of the persons) may be mapped in the monitored space. Both the physical location and/or the activity data of the activity detectors and/or the authorized persons may be considered as fixed activities within the monitored space, as both data are typically authorized, whereas spatiotemporal movement data may be unauthorized within the space. Availability of the physical location and/or activity information (e.g., positioning, and/or orientation, and/or posture, etc) in the monitored space may be essential for correlating between the detected physical activities and the inertial data patterns, since mapping the fixed physical activities in the monitored space, in particular with respect to spatiotemporal movement patterns, may significantly increase the reliability of the correlation.

In optional implementations of the first and/or the second aspects, the inertial data patterns may identify at least one of: a posture, a direction and/or an orientation of the plurality of persons within the monitored space, and/or optionally, identification of at least one of: a posture, a direction and/or an orientation of the plurality of persons within the monitored space in specific times and/or over a time duration. Identifying inertial characteristics of each of the persons to obtain respective patterns may significantly improve the accuracy and/or reliability of the correlation. Identifying the posture, direction and/or orientation of the detected person in the monitored space may increase the ability to determine, e.g., whether the detected person is authorized to be within the monitored space and/or whether the detected person is in operational proximity to a certain region within the monitored space.

Some embodiments of the present invention utilize activity sensors deployed in a monitored space, which are typically available in existing commercial spaces, such as in offices and in other commercial environments, for example, stationary activity detectors (e.g., motion sensors, presence sensors, imaging sensors, etc), signal emitters and/or signal receivers, and/or the like, which may capture physical activity (e.g., location, orientation, motion, etc) of persons in the monitored location, to obtain monitored space activity data. The system may collect monitored space activity data from each of the activity detectors continuously and/or periodically and/or upon detection of indication of access to the monitored location, for example, by entering and/or exiting the space. The collected space activity data may include and/or be associated with timing of the captured activity of the moving objects.

Some embodiments of the present invention yet further provide a system and method of analyzing the monitored space activity data to identify a plurality of spatiotemporal movement patterns associated with the moving objects in the monitored space, such as, a presence, a duration of the presence, a movement, a path of movement, duration of the movement, presence of other objects (such as unauthorized persons) and a physical interaction with the mobile devices and/or other existing devices in the space (such as, a printer, a computer, etc).

The activity detectors may communicate (e.g., via wired and/or wireless communications) the captured space activity data to a server, which may be located in and/or proximate to the monitored space, and which may analyze the data to identify a plurality of spatiotemporal movement patterns.

Moreover, some embodiments of the present invention utilize inertial data patterns from each of a plurality of applications executed in a plurality of mobile devices associated with one of a plurality of persons, each inertial data patterns is recorded using at least one inertial sensing device (e.g., inertial measurement unit (IMU), and/or inertial navigation device, and/or inertial guidance system, etc.) installed in one of the plurality of mobile devices, for example, a smartphone, a cellular device, a tablet, a wearable device (e.g., a tag card, a bracelet, a key chain, etc.) and/or the like.

At least one navigational sensing data (e.g., direction, orientation, position, velocity, posture, etc.) may be generated by the inertial sensing devices, for example, inertia-sensing devices, magnetic field sensing devices, gyroscopic devices, depth-sensing 3D camera systems (such as a Tango Sensor), etc. Such devices may include a compass to determine the direction in which a person carrying and/or holding the mobile device is traveling, an accelerometer to detect acceleration, and a gyroscope to detect a motion (movement of the person) to evaluate a person's position, by, e.g., estimating a relative position based on a previous position, depth-sensing systems for providing mobile device point-of-view and/or point-of-interest information, etc. As such, inertial sensing devices can be used to determine that a person associated with a mobile device has moved by a particular amount with respect to a known earlier position based on direction, acceleration, and/or motion information generated by at least one of the inertial sensing devices (e.g., compass, accelerometer, gyroscope, etc). As appreciated, inertial sensing devices may not depend on subsequent external information from other devices after receiving initial location information (e.g., location ID's and/or location information received from external systems and/or devices). Inertial sensing devices may depend on readily available stimuli such as the earth's magnetic field measured by, e.g., magnetometers (compasses), and a person's generated motion as measured by accelerometers and/or gyroscopes. Thus, inertial sensing devices may be used to determine location information of the mobile devices in environments (e.g., indoor spaces), in which location information such as GPS signals are not readily available.

A plurality of inertial data patterns associated with each of the mobile devices may be obtained. The mobile devices can communicate (e.g., via wired and/or wireless communications) the recorded inertial data pattern to a server, which may be located in or proximate to the monitored space.

Inertial sensing devices, which are also typically available in existing mobile devices, may be used according to the invention to record motion patterns from applications executed in the mobile devices associated with one of a plurality of persons. Based on the obtained inertial data patterns, the systems and methods of the invention may identify at least one correlation between the inertial data patterns and spatiotemporal movement patterns (e.g., obtained by analyzing monitored space activity data). Based on the correlation, the system and method of the invention, may evaluate whether to authenticate physical activities, in particular, whether to authenticate physical activities associated with mobile devices, and/or whether to identify a location of persons.

The evaluation may be based on one or more validation rules, for example, rules for evaluating authorization of a certain person detected in the monitored space to access the space and/or distinct regions within the space. The method of the invention may evaluate the validity of the captured physical activity based on positive and/or negative correlation. Negative correlation relates to detected physical activity of moving objects (e.g., spatiotemporal movement pattern), which cannot be correlated to the physical activity of any of the authorized persons present and identified (e.g., by identification of a given mobile device in a certain location) in the monitored space.

This may be indicative that the physical activity is unauthorized and may therefore present a potential security threat. Positive correlation relates to detected physical activity, which may be correlated with one of the persons in the monitored space, and which may be indicative of an authorized physical activity.

The methods and systems of the invention may initiate actions, for example, a signal generated to at least one person in proximity to the detected potential security threat and/or to automated systems and/or to prevent access to the mobile devices associated with the detected person, prevent the detected person from leaving the space, prevent access to resources in the space, prevent access to restricted regions in the space, and/or the like. For example, the monitored space may comprise at least one access-restricted monitored region and the analyzing may utilize location data associated with each of the spatiotemporal movement patterns in the access-restricted region. The location data may be correlated with motion patterns of each of the persons in the region to authenticate access of the person in the region according to the correlation.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some embodiments of the present invention provide a system, a method, and/or may implement a computer program (e.g., a software, an application and/or an algorithm), which may include computer readable program instructions for analyzing data relating to physical activities obtained from activity detectors deployed in the monitored space and/or for analyzing inertial data patterns recorded using inertial sensing devices in a mobile device. Alternatively and/or additionally, the analyzing may be executed via an application installed in any of the mobile devices in the monitored space.

The computer readable program instructions may be downloaded to respective computing/processing devices from a computer readable storage medium and/or to an external computer and/or external storage device via a network, for example, the internet, a local area network, a wide area network and/or a wireless network. A network interface in the computing/processing device may receive computer readable program instructions from the network and may forward the computer readable program instructions for storage in an appropriate computer storage medium, which may be within and/or separate from the respective computing/processing device. Some embodiments of the invention may provide analysis of data based content by comparing the captured data (e.g., spatiotemporal movement patterns and/or motion patterns) to data stored in a database. For example, some embodiments of some aspects of the invention identify a location of a plurality of persons according to at least one correlation between inertial data patterns and one of the spatiotemporal movement patterns to generate navigational information via the mobile device based on the identified location. The identifying at least one correlation may be computed by determining whether a person was exposed to a location and/or a location based content by comparing data of the identified location to location data stored in a database. The identifying at least one correlation may provide tags for each one of the plurality of mobile devices and storing the tags in a database for mapping each one of the plurality of mobile devices and comparing data of each of the mapped mobile devices to the identified location and/or location based content (e.g., a product, a service or an advertisement).

Some embodiments of the present invention may provide computer readable program instructions that may be partly and/or entirely executed on a server. The server may be connected to the mobile devices and/or to the activity detectors through any type of network, e.g., a local area network (LAN), a wide area network (WAN) and/or the like. Additionally and/or alternatively, the connection may be made to an external computer (for example, through the internet). In order to perform some embodiments of the present invention, a programmable logic circuitry and/or programmable logic arrays (PLA) may execute computer readable program instructions.

Some embodiments of the present invention may provide identifying an inertial data pattern by learning motion patterns of each person currently occupying the monitored space and correlating thereof with a motion pattern of the person to authenticate a physical activity according to each of the correlation. For example, some embodiments of some aspects of the invention provide learning motion patterns of each person currently occupying the monitored space to correlate inertial and/or directional information from a mobile device with readings from the activity sensors detecting a physical activity. As such, readings from activity sensor(s) within a certain time interval informing that a person in a distinct area in the monitored space is in a distinct posture (e.g., standing still, sitting, etc), and optionally, is in a distinct direction, may be correlated with inertial and/or directional information from a mobile device in same time interval, to authenticate a physical activity of that person. For example, a physical activity is detected by fixed activity sensor in the monitored space, which informs that a person is present in Room X and is in a certain position (e.g., standing still) at a certain time (e.g., 00:12:14) and walking in a certain direction at a defined time interval (e.g., walking North from 00:12:15 to 00:12:30).

Some embodiments provide authenticating physical activity in a monitored space by learning inertial data patterns and analyzing over a time interval at least one inertial and/or directional data associated with authorized persons in the monitored space and correlating each of the inertial and/or directional data with the spatiotemporal movement patterns to authenticate each of the physical activities according to each of the correlations.

Optionally, one or more machine learning techniques and/or algorithms may be applied to learn the activity patterns of one or more of the persons occupying the monitored location in order to create activity patterns to be used as basis for identifying a physical activity.

The monitoring application may evaluate the validity of the detected access event(s) based on positive and/or negative correlation and applying the validation rules and/or the learned activity patterns.

Some embodiments of the present invention are described herein with reference to flowchart illustrations and/or block diagrams of methods and systems according to some embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and/or computer program products according to some embodiments of the present invention.

Each block in the flowchart and/or block diagrams may represent a module, segment, and/or portion of instructions, which comprises at least one executable instruction for implementing specified logical functions. Some alternative implementations utilize functions noted in the flowchart and/or block diagrams in a different order than the Figures described herein. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
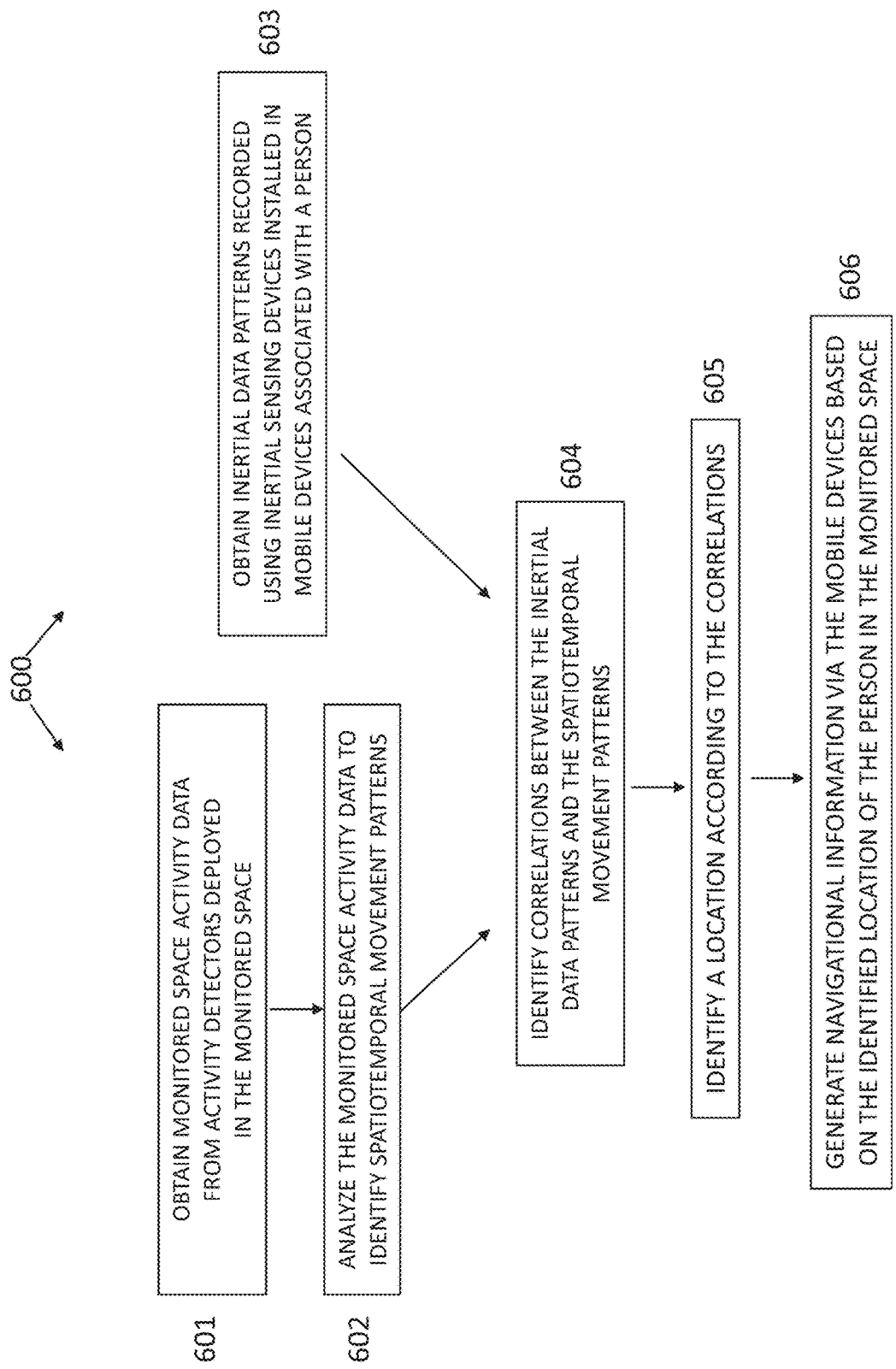
FIG. 6 is a flowchart of an exemplary method of monitoring a consumer in a space, according to some embodiments of the present invention.

Each of the flowcharts depicted in FIG. 1 and FIG. 6, may be executed consecutively for continuously obtaining physical activity data of moving objects in the monitored space.

Figure 2:
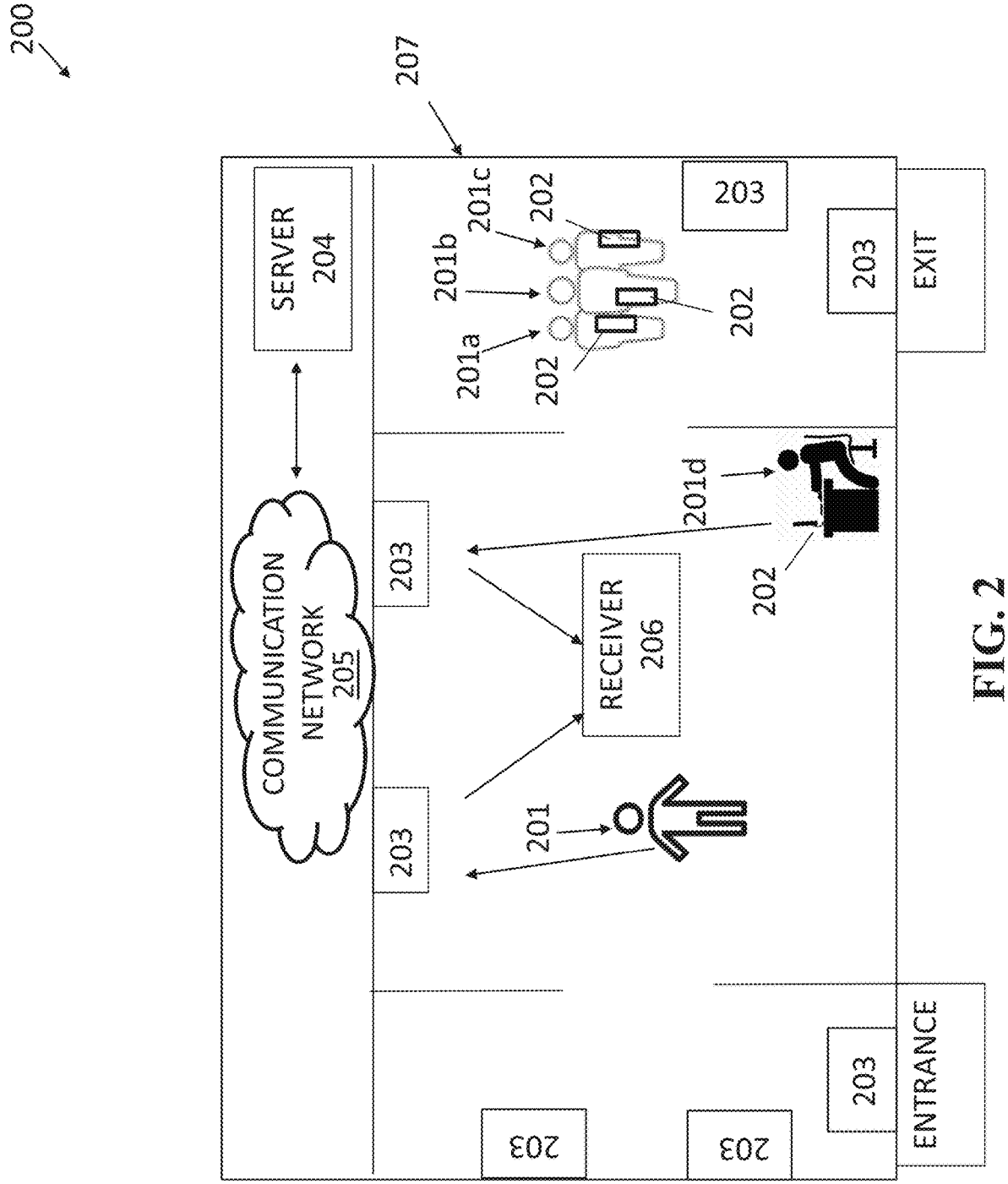
FIG. 2 is a schematic illustration of an exemplary system for authenticating physical activity in a monitored space, according to some embodiments of the present invention.

Reference is now made to FIG. 1, which represents a flowchart of an exemplary method of authenticating physical activity in a monitored space, according to some embodiments of the present invention. Reference is also made to FIG. 2, which presents a schematic illustration of an exemplary system for authenticating physical activity in a monitored space, according to some embodiments of the present invention. Reference is also made to FIG. 6, which presents a flowchart of an exemplary method of monitoring a consumer in a monitored space, according to some embodiments of the present invention.

Generally, the methods 100, 600 and system 200 of some embodiments of some aspects of the present invention correlate spatiotemporal movement patterns deduced from monitored space activity data obtained from at least one activity detector 203 deployed in a monitored space 101, 207 with inertial data patterns 103 of persons 201 located in the monitored space 101. The inertial data patterns 103 are recorded by applications installed in a mobile device 202, each of the patterns associated with each of the persons 201 and recorded using inertial sensing devices installed in the mobile device(s) 202, 103. The monitored space activity data from a plurality of activity detectors 203 is obtained by simultaneously capturing physical activity (e.g., motion) of a plurality of moving objects in the monitored space 101. The activity detectors 203 may be connected to the system 200 through an interconnection (and/or may share the interconnection) and optionally comprising at least one interface and/or at least one network server 204. The interface may include at least one wired and/or wireless interface, for example, a Radio Frequency (RF) interface, a Bluetooth interface, a Wireless LAN (Wi-Fi) interface, a Controller Area Network (CAN) bus interface, and/or the like for connecting to the interconnection to communicate with the activity detectors 203.

The activity detectors 203 may be adapted to capture physical activity (as the space activity data) of at least one object in the monitored space 101. The activity detectors 203 may include one or more monitoring sensors, for example, a stationary detector, a motion sensor (e.g., a passive infrared (PIR) sensor, a microwave (MW) sensor, etc.), a presence sensor, an imaging sensor, a magnet sensor, an acoustic sensor and/or the like.

For example, some embodiments utilize a motion sensor for capturing a new presence of a person in the monitored space, e.g., a Passive Infrared (PIR) motion sensor, a microwave sensor, a laser tripwire and a temperature gauge. The identifying at least one correlation may be carried out by analyzing inertial data measurements indicative of physical movement (e.g., walking) and captured new presence data (e.g., presence data obtained from a presence sensor detecting entrance and/or exit door open/close) in the monitored space and/or a region in the monitored space.

The monitoring sensors may detect and/or capture space activity data 101, for example, interaction of one or more person with at least one device and/or element in the monitored space, for example, a keyboard, a mouse, a computer; presence data received from entrance and/or exit door open/close to estimate a presence of a person in the monitored space; posture activity attributes identified by analyzing a plurality of images obtained from one or more imaging sensors; and/or the like).

For example, in case the activity detector 203 is an image sensor, such as, a camera, an infrared sensor and/or the like, the space activity data provided by the imaging sensor may include motion, presence and/or activity of the plurality of persons 201 in the monitored space. In another example, in case the space activity detectors 203 include presence sensors, for example, a door open/close sensor (e.g., magnetic sensor and/or the like), the space activity data may include presence data of the detected persons.

As shown in 102, the space activity data may be analyzed by a monitoring application, for example, extracts, analyzes, infers, manipulates and/or the like to identify a plurality of spatiotemporal movement patterns for the plurality of persons 201 in the monitored space 207. The analysis conducted by the monitoring application may be adapted to the type of the activity detectors 203, which provide the space activity data. For example, assuming the space activity data comprises images captured by an imaging sensor 203, the monitoring application may apply, for example, one or more image processing tools, techniques and/or algorithms as known in the art to detect and/or location track the plurality of persons 201 and their physical activity attributes.

The spatiotemporal movement patterns may be created by aggregating space activity data obtained from multiple activity detectors 203 of the same and/or of different types to enhance the spatiotemporal movement patterns to better characterize the physical activity of the persons 201. For example, the monitoring application may collect presence data (as the space activity data) from a plurality of motion sensors and/or presence sensors detecting the plurality of persons 201, as well as posture activity attributes 101 that may be identified by analyzing a plurality of images obtained from imaging sensors 102. The monitoring application may aggregate, combine and/or complement the space activity data to generate the spatiotemporal movement patterns 102, which is then correlated with a plurality of inertial data patterns of each of the authorized persons in the monitored space 104 (e.g., obtained from inertial data recorded by inertial sensing devices in mobile devices 202 associated with each of the authorized persons), to thereby authenticate the detected physical activity in accordance with the correlation 105.

The monitored space activity data present spatiotemporal physical activity of the plurality of persons 201 such that physical activity of the persons 201 may be mapped to a specific location during a certain time. The spatiotemporal movement patterns may describe a plurality of activity attributes of the persons 201, for example, a timing, a presence, duration of the presence, a movement, a path of movement, duration of the movement and/or the like. The movement patterns may further include additional activity attributes of the persons 201, for example, a posture, an orientation, a relative position (e.g., with respect to the activity detectors) and/or the like. Such additional activity attributes may be identified using one or more analysis techniques, for example, analyzing a plurality of images captured by imaging sensor type activity detectors 203. In addition, the activity pattern may be correlated with a plurality of inertial data patterns of each of the authorized persons in the monitored space 104.

The activity detectors 203 may be coupled and/or otherwise connected to a receiver 206 at a first interconnection and may optionally transmit monitored space 207 activity data from the detector 203 to the server 204 for analyzing the activity data 102 and identifying at least one correlation 104 between the spatiotemporal movement patterns (e.g., obtained from detected physical activity of moving objects) and inertial data patterns (e.g., obtained from inertial data recorded by inertial sensing devices in mobile devices 202).

A monitoring application for monitoring and/or authorizing physical activities optionally comprising a plurality of program instructions from a storage element adapted for storing at least one software modules (e.g., OS, an application, a tool, an agent, a service, a script and/or the like) may be executed by the server 204. Additionally and/or alternatively, the monitoring application may be implemented as at least one remote service, including, a cloud service, Software as a Service (SaaS), a Platform as a Service (PaaS) and/or the like.

Some embodiments of some aspects of the present invention, such as methods 100, 600 and system 200, correlate spatiotemporal movement patterns deduced from monitored space 207 activity data obtained from at least one activity detector 203 deployed in a monitored space 101 and inertial data patterns 103 of person(s) 201 located in the monitored space 207.

The physical activity is analyzed to identify a plurality of spatiotemporal movement patterns in the monitored space 102. At least one correlation is identified between at least one of the plurality of inertial data patterns and at least one of the plurality of spatiotemporal movement patterns 104.

Figure 3:
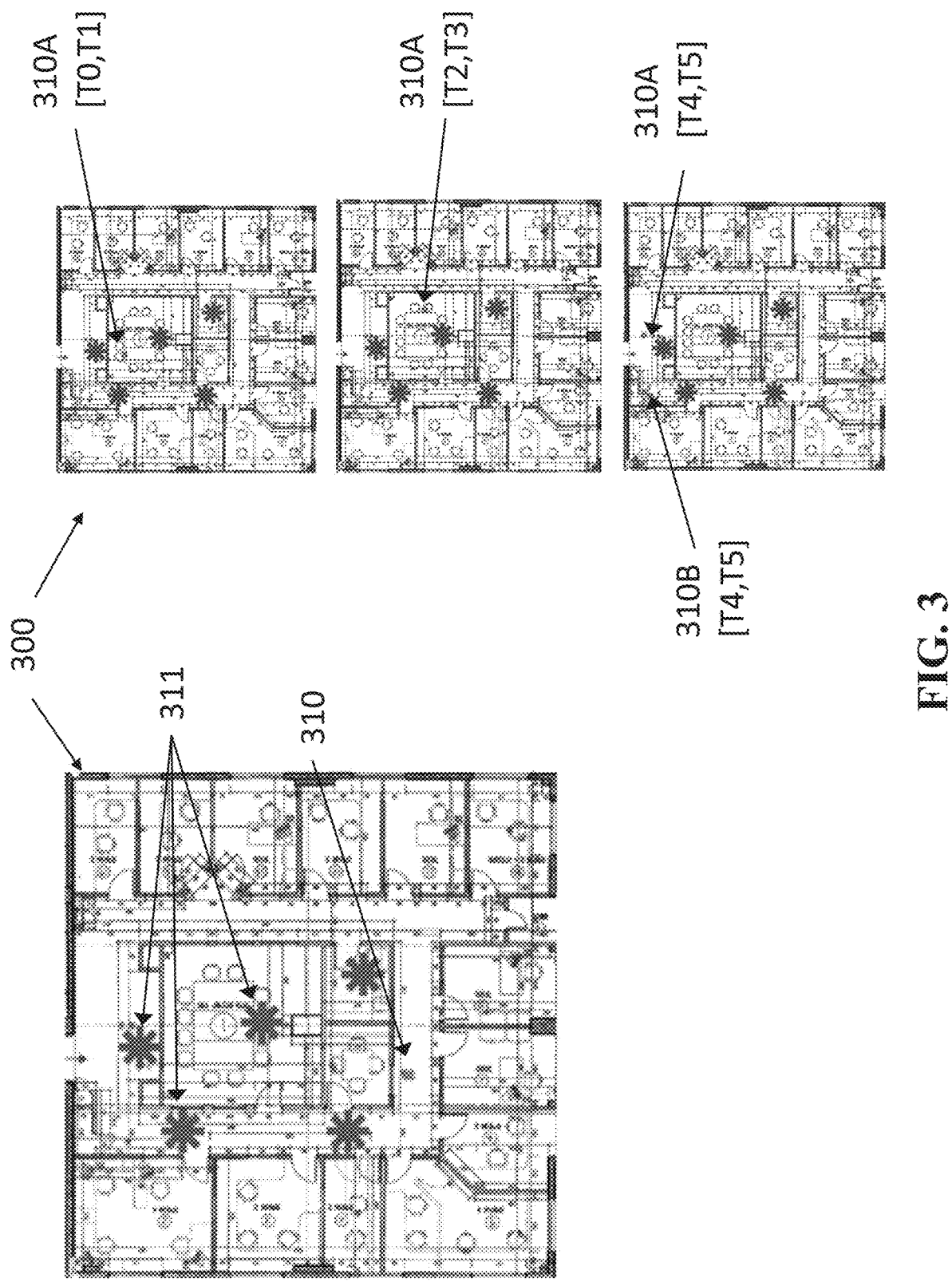
FIG. 3 is a graph showing an illustration of an exemplary monitored space deployed with a system according to some embodiments of the present invention, and in which positions of multiple persons are tracked in distinct areas in the monitored space during time frames $T_0$ to $T_5$ by fixed camera sensors positioned on the ceiling of an office.

Reference is now also made to FIG. 3, showing an illustration of an exemplary monitored space 300 deployed with a system according to some embodiments of the present invention, and in which positions of objects having fixed camera sensors on the ceiling of an office for tracking activity of a plurality of persons during different time frames [Tx, Ty], which refers to a time frame (e.g., time duration) between Tx to Ty, for example, [T0, T1], [T2, T3] and [T4, T5]. An exemplary monitored location 300, for example, an organization facility, an institution facility, a secure facility, a retail establishment, a grocery shop and/or the like may be deployed with a system similar to the system 200 according to some embodiments of the present invention. The monitored space 300 may be composed of a plurality of distinct areas, for example, rooms, offices, public areas, hallways, conference rooms, open spaces, lobbies, recreation rooms and/or the like, having a plurality of persons 310A, 310B, 311 in each of the distinct areas.

The physical location of at least one of the activity detectors 203 in the monitored space 207 may be mapped and available through mapping information such that the location of the activity detectors 203 in the monitored space 207 is known. The mapping information may be correlated with the structural information of the monitored space 207 and may include, for example, a location (e.g. coordinates) and/or area in the monitored space 207. The mapping information may further include additional mapping data of the respective activity detector 203, for example, an elevation, an orientation, a Field of View (FOV), a range, a resolution and/or the like.

Optionally, the activity detectors 203 in the monitored space 207 may be associated with a plurality of the persons 201 in the monitored space 207, for example, a person 201a, a person 201b, and/or a person 201c.

A plurality of activity detectors such as the space activity detectors 203 may be deployed in the monitored space 200 to capture simultaneously physical activity of a plurality of moving objects 101 in the monitored space 200.

Physical activity of a plurality of persons in the space, such as timing, position at time $t_n$ (e.g., if a person in the monitored space is stationary in $t_n$, for example, sitting, standing), orientation at $t_n$ and/or the like, corresponding with the spatiotemporal movement data recorded by using inertial sensing devices 103 installed in the mobile devices 202. The mobile devices 202 to be identified encompass a wide variety of electronic platforms enabling detection of physical activity deduced by inertial data recorded by inertial sensors implemented in the mobile devices 202, for example, mobile phones, mobile computers, processing devices, wearable devices, smartwatches, smart cards, and/or the like.

Inertial data (location, position, orientation, posture, direction, etc.) of persons recorded by inertial sensing devices installed in mobile devices 202, for example, accelerometer, magnetometer, gyroscope, compass, and/or the like, may be used to accurately pinpoint the location and position of each of the mobile devices 103, 202. For example, a three-axis accelerometer can be used to establish three-dimensional gravity vectors, of the mobile devices 202 to provide data on position of each of the persons 201a, 201b, 201c.

Some embodiments of some aspects of the present invention provide a system 200 for authenticating physical activity associated with a mobile device 202 in a monitored space 207, comprising: at least one activity detector 203 deployed in the monitored space 207 to capture simultaneously physical activity of a plurality of moving objects 201 associated with mobile devices 202 in the monitored space 207; a receiver 206 receiving at least one signal from the at least one activity detector 203 indicating a physical activity in the monitored space; at least one inertial sensing device installed in a plurality of mobile devices 202 to record inertial data patterns of each of the persons in the monitored space, each one of the plurality of mobile devices 202 is associated with one of a plurality of persons; at least one processor 204 coupled to the plurality of mobile devices 202 and to the at least one activity detector 203 via at least one network 205, and adapted to identify at least one correlation between at least one of the plurality of inertial data patterns and at least one of the plurality of spatiotemporal movement patterns. The correlating may be carried out while recording the inertial data patterns consecutively and/or periodically.

Figure 4:
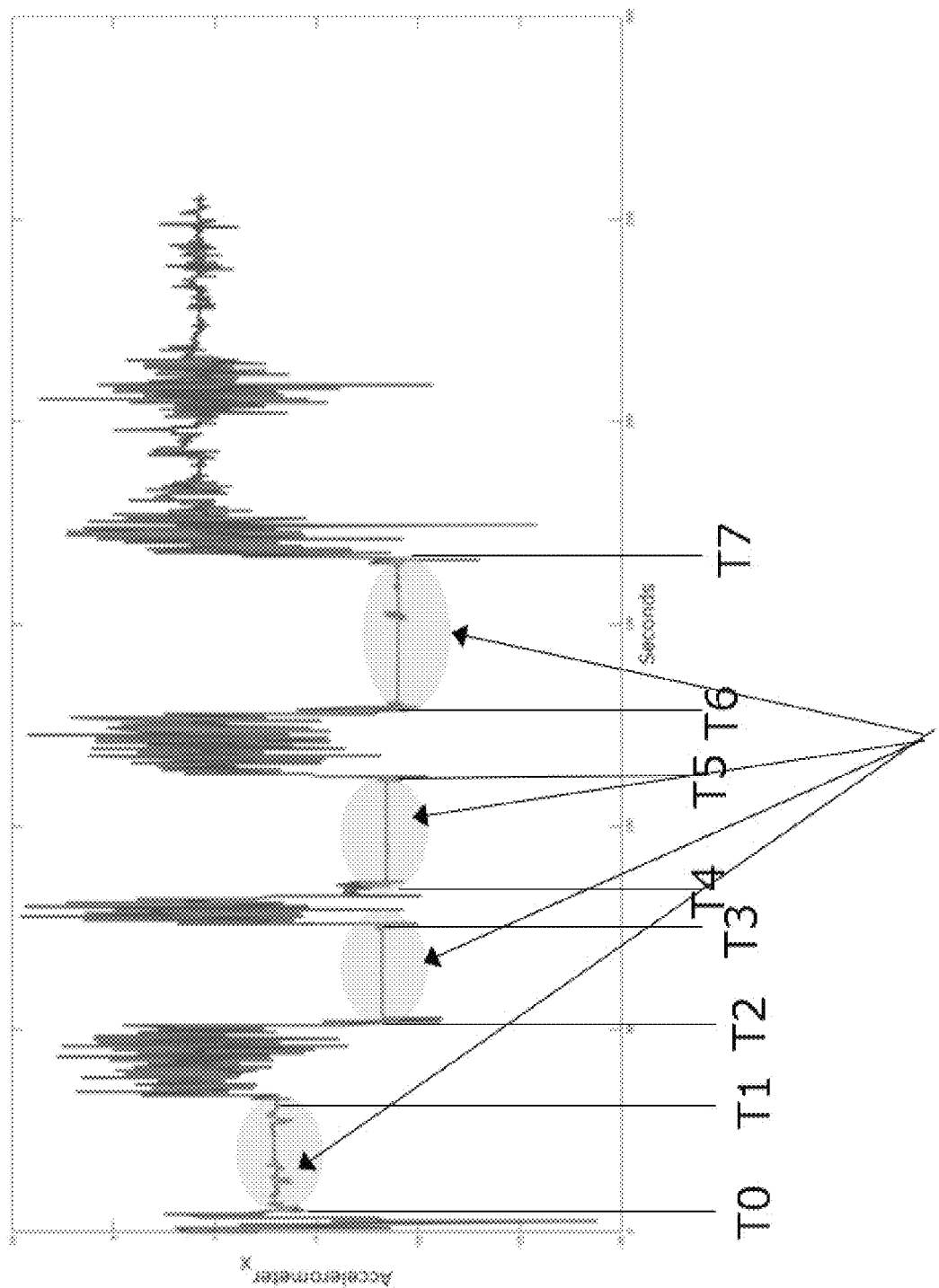
FIG. 4 is a graph showing four stationary periods, corresponding to times in which a person was in stationary position, according to some embodiments of the present invention.

Reference is now made to FIG. 4 depicting a graph showing four stationary periods corresponding to times $T_0$ to $T_7$ in which a person carrying a mobile device installed with an accelerometer was in a stationary position within the monitored space, according to some embodiments of the present invention. For example, as may be seen from FIG. 4, at $T_2$-$T_3$, a person carrying a mobile device (mobile phone or wearable device) is stationary, (e.g., sitting or standing still).

Figure 5:
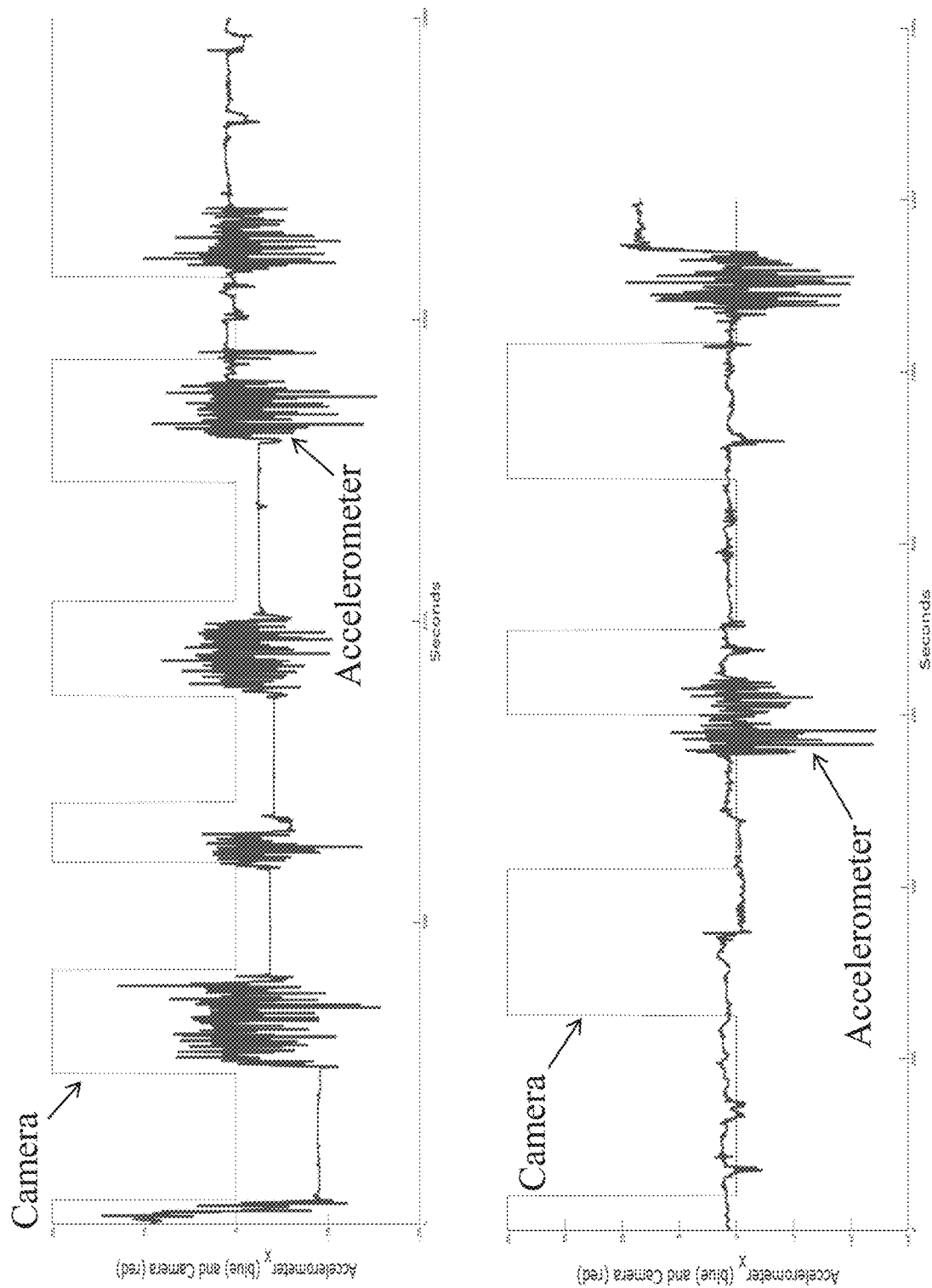
FIG. 5 is a graph showing correlation between fixed visual motion (camera) and mobile sensor motion of two detected persons, according to some embodiments of the present invention.

Reference is now made to FIG. 5 depicting a graph showing correlation between fixed visual motion sensor (camera) capturing images of a person detected in motion during distinct times $T_4$ to $T_5$ and sensor motion (mobile sensor) of multiple detected persons, according to some embodiments of the present invention. The detected persons are referred to in FIG. 5 as Detected Person 1 and Detected Person 2. The first graph for Detected Person 1 shows good correlation between inertial sensing device data obtained from accelerometer installed in Mobile Device 1 of a user detected during $[T_0, T_1]$, $[T_2, T_3]$, and $[T_4, T_5]$; and the image data obtained from the visual motion sensor (camera) of a detected person in motion. The second graph for Detected Person 2 shows poor correlation between inertial sensing device data obtained from accelerometer installed in Mobile Device 2 of a user detected during To $t_0$ $T_1$ as above said, and the image data obtained from the visual motion sensor (camera) of a detected person in motion.

The mobile devices 202 may rotate to any orientation using updated information from the accelerometer, compass, magnetometer and/or gyroscope.

The mobile devices and/or processing devices and/or wearable devices 202 may communicate with each other as well as with other communication networks 205, for example, through a storage resource, a service, a router, a gateway and/or the like.

Each of the mobile devices 202 may be associated with a respective person 201 carrying the mobile device 202, e.g., the mobile devices may be carried and/or held by a certain authorized person 201.

Some embodiments of the present invention provide a method for monitoring at least one access-restricted region where the analyzing further comprising obtaining location data associated with each of the spatiotemporal movement patterns in the at least one access-restricted region, and correlating the location data with inertial data patterns of each of the plurality of persons in the region to authenticate access of the person in the region according to the correlation.

Some embodiments of the present invention provide mapping location data of each of the plurality of persons to identify at least one irregularity in the monitored region, e.g., identifying anomalies relating to physical activities in the monitored region, such as physical activities of unauthorized persons detected in the monitored region carrying an authorized mobile device.

Some embodiments of the present invention provide a method wherein the mapping is correlated with structural information of the monitored region to calculate navigational instructions associated with each of the irregularities.

The physical location of the monitored regions in the location may be mapped and available through mapping information such that the location of each of the mobile devices 203 in the monitored space 207 is known. The mapping information may be correlated with structural information of each of the monitored regions in the monitored space 207 and may include, for example, a location in the monitored space 207, in which each of the mobile devices 203 are located. One or more additional network resources, for example, a storage resource, a service, a cloud service and/or the like may be accessible through one or more of the processing nodes.

The location may be monitored by activity detector(s) deployed in the location, for example, stationary activity detectors (e.g., a motion sensor, a presence sensor, an imaging sensor, etc.) and/or the like, which may capture space activity of persons in the monitored location as above said.

A plurality of activity detectors 203 may be disposed to cover an entire space environment. Each activity detector 203 may cover a predetermined region in the space, and each may be assigned a distinctive location in the space by a server 204, which may be connected and/or otherwise coupled to the activity detectors 203 via a communication network 205.

The activity detectors 203 may be connected and/or otherwise coupled to a processor and/or server 204 for deducing, based on received signals, whether a detected person is present in a field of view (FOV), and may provide an indication of an access attempt to the space based on validating a presence of the detected person (e.g., physical activity) according to an identified correlation between spatiotemporal movement patterns deduced from monitored space activity data obtained from at least one activity detector 203 deployed in a monitored space 101 and inertial data patterns of persons 201 located in the monitored space 207.

For example, a network may be facilitated through one or more wired interface connection(s), such as, Ethernet interface connection, and/or through wireless communication network(s), including, Local Area Networks (LAN), Wide Area Network (WAN) and/or the like, an isolated WLAN (e.g., Wi-Fi), a Controller Area Network (CAN) bus a Bluetooth network, and/or the like. However it should be recognized that some embodiments of the present invention may be utilized through other wired and/or wireless communication systems.

A physical location of the plurality of mobile devices (and/or any processing device) as well as a physical location of the at least one activity detectors (e.g., fixed image sensor for obtaining monitored space activity data) may be mapped such that their location is known.

Monitored space activity data may be provided by at least one of the activity detectors (e.g., visual imaging sensors, presence sensors, motion sensors, etc.), which may be deployed in fixed areas in the monitored location. Non-limiting examples of imaging sensors are: fixed camera sensors, people detectors (e.g., Point Grab's Cognipoint http://www(dot)pointgrab(dot)com/and/or Omron's device https://www(dot)omron(dot)com/media/press/2016/12/c1205(dot)html) in the monitored location. Collecting the monitored space activity data may be carried out continuously, and/or periodically and/or the collecting monitored space activity data may be triggered by the detection of a physical activity of at least one of a plurality of persons in the monitored location. The monitored space activity data may be analyzed to identify at least one of the activity patterns corresponding to a physical activity of a plurality of persons in the monitored location, for example, a timing (time, order, sequence, etc.), a presence, a duration of the presence, a movement (e.g., stationary, sitting, standing, lying down, etc.), a path of movement (e.g., walking and direction of walking), a duration of the movement, presence of other person(s) and a physical interaction with other detected persons. The activity data may be further analyzed by algorithms of posture and/or activity detectors that may detect (e.g., a person walking, standing, sitting, lying down, typing on a keyboard, looking at a screen, swiping an RFID and/or NFC tag, etc.) to identify the detected persons and/or enhance the activity patterns of the detected persons.

Further aspects of the invention provide a method of consumer monitoring in a consumer space 600. Consumers may share their space activity information 601 so that a business establishment may better provide information to the consumer. For example, consumers may allow a business establishment, such as a shopping mall, to provide the consumer with navigational information 606 to conveniently locate a product in an aisle and/or on a shelf, without need for direct communication and/or assistance from a sales person.

Some embodiments of some aspects of the invention provide a method 600 for monitoring a consumer in a space. The method may obtain monitored space activity data from at least one activity detector deployed in a monitored location to capture simultaneously physical activity of a plurality of moving objects in the monitored space 601, and analyzing the monitored space activity data to identify a plurality of spatiotemporal movement patterns 602. The method may obtain a plurality of inertial data patterns from each one of a plurality of applications executed in a plurality of mobile devices, recorded using at least one inertial sensing devices installed in one of the plurality of mobile devices associated with one of a plurality of persons 603. At least one correlation between at least one of the plurality of inertial data patterns and at least one of the plurality of spatiotemporal movement patterns may be identified 604. Additionally and/or alternatively, a location of one of the plurality of persons according to the at least one correlation may also be identified 605 (e.g., between inertial data patterns and one of the spatiotemporal movement patterns). Navigational information via the mobile device based on the identified location may be generated 606.

Some embodiments provide identifying at least one correlation 604 by determining whether a person was exposed to a location and/or a location based content by comparing data of the identified location to location data stored in a database. The identifying at least one correlation may provide tags for each one of the plurality of mobile devices and storing the tags in a database for mapping each one of the plurality of mobile devices and comparing data of each of the mapped mobile devices to the identified location and/or location based content (e.g., a product, a service or an advertisement).

Some embodiments of the present invention provide a system for monitoring a consumer in a monitored space, comprising: at least one activity detector deployed in the monitored space to capture simultaneously physical activity of a plurality of moving objects in the monitored space; a receiver receiving at least one signal from the at least one activity detector indicating a physical activity in the monitored space; at least one inertial sensing device installed in a plurality of mobile devices to record inertial data patterns of each the persons in the monitored space, each one of the plurality of mobile devices is associated with one of a plurality of persons; at least one server coupled to the plurality of mobile devices and to the at least one activity detector via at least one network, and adapted to identify: at least one correlation between at least one of the plurality of inertial data patterns and at least one of the plurality of spatiotemporal movement patterns; and a location of one of the plurality of persons according to the at least one correlation.

It is expected that during the life of a patent maturing from this application many relevant systems, methods and computer programs will be developed and the scope of the term activity detector is intended to include all such new technologies a priori. In addition, it is expected that the scope of the term inertial sensing device is intended to include all new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of authenticating physical activity in a monitored space, comprising:
    obtaining monitored space activity data from at least one activity detector deployed in the monitored space to capture simultaneously physical activity of a plurality of moving objects in said monitored space;
    analyzing said monitored space activity data to identify a plurality of spatiotemporal movement patterns in said monitored space;
    obtaining a plurality of inertial data patterns from each one of a plurality of applications executed in a plurality of mobile devices, each one of said inertial data patterns is recorded using an inertial sensing device installed in one of said plurality of mobile devices, each one of said plurality of mobile devices is associated with one of a plurality of persons;
    identifying at least one correlation between at least one of said plurality of inertial data patterns and at least one of said plurality of spatiotemporal movement patterns;
    performing an analysis of said spatiotemporal movement patterns and said plurality of inertial data patterns for identifying at least a current presence and a current posture attribute of said at least one of said plurality of persons;
    authenticating said physical activity according to said at least one correlation;
    identifying at least one authorized person present in said monitored space, said at least one authorized person is authorized to perform at least one authorized physical activity characterized by authorized presence in said monitored space and at least one authorized posture attribute of said at least one authorized person in said monitored space;
    determining when said physical activity deviates from each of said at least one authorized physical activity of each of said at least one authorized person present and identified in said monitored space by comparing between said authorized presence and said current presence, and between said authorized posture attribute and said current posture attribute; and
    initiating at least one action according to said determination.

2. The method of claim 1, wherein the identifying at least one correlation is carried out while recording said inertial data patterns.

3. The method of claim 1, wherein said monitored space comprising at least one access-restricted monitored region and said analyzing further comprising analyzing location data associated with each of said spatiotemporal movement patterns in the at least one access-restricted region, and correlating said location data with inertial data patterns of each of the plurality of persons in said region to authenticate access of said person to said region according to said correlation.

4. The method of claim 3, wherein the location data of each of said person is mapped to identify at least one irregularity in said monitored region.

5. The method of claim 4, wherein said mapping is correlated with structural information of the monitored region to calculate navigational instructions associated with each of said irregularity.

6. The method of claim 1, wherein the at least one activity detector is a motion sensor capturing motion of said at least one person in said monitored space, and correlating said captured motion to inertial data patterns recorded in each of said plurality of mobile devices associated with one of a plurality of persons.

7. The method of claim 1, wherein the identifying at least one correlation is carried out without identifying a person based on an image of said person captured by a camera installed in the mobile devices.

8. The method of claim 1, further comprising identifying a deviating person activity pattern by learning, over a time interval, inertial data and/or directional data associated with each person authorized to occupy said monitored space and correlating each of said inertial and/or directional data with said spatiotemporal movement patterns to authenticate each of the physical activities according to each of said correlations.

9. The method of claim 1, wherein the identifying at least one correlation between said plurality of inertial data patterns and said plurality of spatiotemporal movement patterns is carried out by at least one processor coupled to a server; and authenticating said physical activity according to said correlation.

10. The method of claim 1, wherein said obtaining monitored space activity data from at least one activity detector is initiated by detecting a signal indicating physical activity of at least one of the moving objects in said monitored space.

11. The method of claim 1, further comprising analyzing an operational status of each of said plurality of mobile devices monitored in said space in conjunction with obtaining monitored space activity data.

12. The method of claim 1, wherein said at least one activity detector generates an indication indicating of a physical activity in said monitored space, said indication is captured by at least one activity detector which forwards said indication to trigger collecting monitored space activity data in said monitored space.

13. The method of claim 1, further comprising communicating said physical activity and spatiotemporal movement pattern to a server via a wireless network.

14. The method of claim 1, further comprising analyzing at least one of a direction, an orientation and a posture of said plurality of persons.

15. The method of claim 1, wherein the monitored space is an indoor location.

16. The method of claim 1, wherein said physical activity comprises at least one member of a group consisting of: a presence, a duration of presence, a movement, a path of movement, a duration of movement, a presence of another person and a physical interaction with the plurality of mobile devices.

17. The method of claim 1, further comprising evaluating, based on said at least one correlation and according to at least one validation rule, when to authenticate said physical activity associated with one of said plurality of mobile devices and/or when to identify a location of at least one of said plurality of persons.

18. The method of claim 1, wherein said plurality of spatiotemporal movement patterns are created by an aggregation and combination of space activity data obtained from a plurality of activity detectors deployed in the monitored space.

19. The method of claim 18, wherein said characterizing of said physical activity is based on said aggregation, and wherein said characterization of said physical activity is indicative of an interaction with at least one device in said monitored space.

20. The method of claim 1, wherein said at least one action is a member of a group consisting of: preventing access to the mobile devices associated with a detected person associated with said deviating physical activity, preventing the detected person from leaving the monitored space, preventing access to resources in the monitored space and preventing access to restricted regions in the monitored space.

21. The method of claim 1, wherein said at least one authorized physical activity in said monitored space is defined in at least one distinct region within said monitored space.

22. A system for authenticating physical activity in a monitored space, comprising:
at least one hardware activity detector deployed in the monitored space, that captures simultaneously physical activity of a plurality of moving objects in said monitored space;
a hardware receiver that receives at least one signal from the at least one hardware activity detector indicating a physical activity in said monitored space;
at least one inertial sensing device installed in a plurality of mobile devices to record inertial data patterns of each said persons in said monitored space, each said plurality of mobile devices is associated with one of a plurality of persons; and
at least one server coupled to said plurality of mobile devices and to said at least one hardware activity detector via at least one network, and adapted to:
identify at least one correlation between at least one of said plurality of inertial data patterns and at least one of said plurality of spatiotemporal movement patterns, said correlating carried out while recording said inertial data patterns;
perform an analysis of said spatiotemporal movement patterns and said plurality of inertial data patterns for identifying at least a current presence and a current posture attribute of said at least one of said plurality of persons;
identify at least one authorized person present in said monitored space, said at least one authorized person is authorized to perform at least one authorized physical activity characterized by authorized presence in said monitored space and at least one authorized posture attribute of said at least one authorized person in said monitored space;
determine when said physical activity deviates from each of said at least one authorized physical activity of each of said at least one authorized person present and identified in said monitored space by comparing between said authorized presence and said current presence, and between said authorized posture attribute and said current posture attribute; and
initiate at least one action according to said determination.

\* \* \* \* \*